US011606971B2

(12) United States Patent
Sur

(10) Patent No.: US 11,606,971 B2
(45) Date of Patent: Mar. 21, 2023

(54) VIDEO ANALYTICS CAMERA SYSTEM FOR AN AEROSOL DELIVERY DEVICE

(71) Applicant: RAI STRATEGIC HOLDINGS, INC., Winston-Salem, NC (US)

(72) Inventor: Rajesh Sur, Winston-Salem, NC (US)

(73) Assignee: RAI Strategic Holdings, Inc., Winston-Salem, NC (US)

( * ) Notice: Subject to any disclaimer, the term of this patent is extended or adjusted under 35 U.S.C. 154(b) by 0 days.

(21) Appl. No.: 17/660,984

(22) Filed: Apr. 27, 2022

(65) Prior Publication Data

US 2022/0248749 A1 Aug. 11, 2022

Related U.S. Application Data

(63) Continuation of application No. 15/651,521, filed on Jul. 17, 2017, now Pat. No. 11,337,456.

(51) Int. Cl.
*H04N 7/18* (2006.01)
*A24F 40/00* (2020.01)
(Continued)

(52) U.S. Cl.
CPC .............. *A24F 40/00* (2020.01); *A24F 40/50* (2020.01); *A24F 40/65* (2020.01); *F24F 11/30* (2018.01);
(Continued)

(58) Field of Classification Search
USPC .......................................................... 348/143
See application file for complete search history.

(56) References Cited

U.S. PATENT DOCUMENTS 1,514,682 A 11/1924 Wilson
1,771,366 A 7/1930 Wyss et al.
(Continued)

FOREIGN PATENT DOCUMENTS

AU 276250 7/1965
CA 2 641 869 5/2010
(Continued)

OTHER PUBLICATIONS

Analog Devices Ahead of What's Possible™ Intelligent Vision Sensing at the Node and in the Shadows, pp. 1-2, Created May 30, 2017.
(Continued)

*Primary Examiner* — Mikhail Itskovich
(74) *Attorney, Agent, or Firm* — Womble Bond Dickinson (US) LLP; Chris Humphrey; John V. Forcier

(57) ABSTRACT

An aerosol delivery device includes a cartridge of aerosol precursor composition, and a control body coupled or coupleable to the cartridge. The control body includes a control component to control delivery of components of the aerosol precursor composition in response to detection of airflow through at least a portion of the cartridge or control body, and includes a camera system with a digital camera to capture video imagery of a scene in a field of view thereof. The camera system or the control component is configured to perform video content analytics on the video imagery to detect a temporal or spatial event in the scene, and transfer at least one of the video imagery or information indicative of the temporal or spatial event externally to a computing device configured to store or display the video imagery or information, or perform at least one control operation based on the information.

21 Claims, 6 Drawing Sheets

(51) Int. Cl.

| | |
|---|---|
| ***F24F 11/30*** | (2018.01) |
| ***F24F 11/62*** | (2018.01) |
| ***H04N 1/21*** | (2006.01) |
| ***A24F 40/50*** | (2020.01) |
| ***A24F 40/65*** | (2020.01) |
| *F24F 11/58* | (2018.01) |
| *F24F 120/10* | (2018.01) |
| *A24F 40/10* | (2020.01) |

(52) U.S. Cl.
CPC ............. *F24F 11/62* (2018.01); *H04N 1/212* (2013.01); *H04N 7/185* (2013.01); *A24F 40/10* (2020.01); *F24F 11/58* (2018.01); *F24F 2120/10* (2018.01)

(56) References Cited

U.S. PATENT DOCUMENTS

| | | | |
|---|---|---|---|
| 2,057,353 | A | 10/1936 | Whittemore, Jr. |
| 2,104,266 | A | 1/1938 | McCormick |
| 3,200,819 | A | 8/1965 | Gilbert |
| 3,479,561 | A | 11/1969 | Janning |
| 4,284,089 | A | 8/1981 | Ray |
| 4,303,083 | A | 12/1981 | Burruss, Jr. |
| 4,735,217 | A | 4/1988 | Gerth et al. |
| 4,848,374 | A | 7/1989 | Chard et al. |
| 4,907,606 | A | 3/1990 | Lilja et al. |
| 4,922,901 | A | 5/1990 | Brooks et al. |
| 4,945,931 | A | 8/1990 | Gori |
| 4,947,874 | A | 8/1990 | Brooks et al. |
| 4,947,875 | A | 8/1990 | Brooks et al. |
| 4,986,286 | A | 1/1991 | Roberts et al. |
| 5,019,122 | A | 5/1991 | Clearman et al. |
| 5,042,510 | A | 8/1991 | Curtiss et al. |
| 5,060,671 | A | 10/1991 | Counts et al. |
| 5,093,894 | A | 3/1992 | Deevi et al. |
| 5,144,962 | A | 9/1992 | Counts et al. |
| 5,249,586 | A | 10/1993 | Morgan et al. |
| 5,261,424 | A | 11/1993 | Sprinkel, Jr. |
| 5,322,075 | A | 6/1994 | Deevi et al. |
| 5,353,813 | A | 10/1994 | Deevi et al. |
| 5,369,723 | A | 11/1994 | Counts et al. |
| 5,372,148 | A | 12/1994 | McCafferty |
| 5,388,574 | A | 2/1995 | Ingebrethsen |
| 5,408,574 | A | 4/1995 | Deevi et al. |
| 5,468,936 | A | 11/1995 | Deevi et al. |
| 5,498,850 | A | 3/1996 | Das |
| 5,515,842 | A | 5/1996 | Ramseyer et al. |
| 5,530,225 | A | 6/1996 | Hajaligol |
| 5,564,442 | A | 10/1996 | MacDonald et al. |
| 5,649,554 | A | 7/1997 | Sprinkel et al. |
| 5,666,977 | A | 9/1997 | Higgins et al. |
| 5,687,746 | A | 11/1997 | Rose et al. |
| 5,726,421 | A | 3/1998 | Fleischhauer et al. |
| 5,727,571 | A | 3/1998 | Meiring et al. |
| 5,743,251 | A | 4/1998 | Howell et al. |
| 5,799,663 | A | 9/1998 | Gross et al. |
| 5,819,756 | A | 10/1998 | Mielordt |
| 5,865,185 | A | 2/1999 | Collins et al. |
| 5,865,186 | A | 2/1999 | Volsey, II |
| 5,878,752 | A | 3/1999 | Adams et al. |
| 5,894,841 | A | 4/1999 | Voges |
| 5,934,289 | A | 8/1999 | Watkins et al. |
| 5,954,979 | A | 9/1999 | Counts et al. |
| 5,967,148 | A | 10/1999 | Harris et al. |
| 6,040,560 | A | 3/2000 | Fleischhauer et al. |
| 6,053,176 | A | 4/2000 | Adams et al. |
| 6,089,857 | A | 7/2000 | Matsuura et al. |
| 6,095,153 | A | 8/2000 | Kessler et al. |
| 6,125,853 | A | 10/2000 | Susa et al. |
| 6,155,268 | A | 12/2000 | Takeuchi |
| 6,164,287 | A | 12/2000 | White |
| 6,196,218 | B1 | 3/2001 | Voges |
| 6,196,219 | B1 | 3/2001 | Hess et al. |
| 6,536,746 | B2 * | 3/2003 | Watkins .................. A61L 9/145 261/78.2 |
| 6,598,607 | B2 | 7/2003 | Adiga et al. |
| 6,601,776 | B1 | 8/2003 | Oljaca et al. |
| 6,615,840 | B1 | 9/2003 | Fournier et al. |
| 6,688,313 | B2 | 2/2004 | Wrenn et al. |
| 6,772,756 | B2 | 8/2004 | Shayan |
| 6,803,545 | B2 | 10/2004 | Blake |
| 6,854,461 | B2 | 2/2005 | Nichols |
| 6,854,470 | B1 | 2/2005 | Pu |
| 7,117,867 | B2 | 10/2006 | Cox et al. |
| 7,293,565 | B2 | 11/2007 | Griffin et al. |
| 7,513,253 | B2 | 4/2009 | Kobayashi et al. |
| 7,775,459 | B2 | 8/2010 | Martens, III et al. |
| 7,832,410 | B2 | 11/2010 | Hon |
| 7,845,359 | B2 | 12/2010 | Montaser |
| 7,896,006 | B2 | 3/2011 | Hamano et al. |
| 8,127,772 | B2 | 3/2012 | Montaser |
| 8,314,591 | B2 | 11/2012 | Terry et al. |
| 8,365,742 | B2 | 2/2013 | Hon |
| 8,402,976 | B2 | 3/2013 | Fernando et al. |
| 8,499,766 | B1 | 8/2013 | Newton |
| 8,528,569 | B1 | 9/2013 | Newton |
| 8,550,069 | B2 | 10/2013 | Alelov |
| 8,851,081 | B2 | 10/2014 | Fernando et al. |
| 2002/0146242 | A1 | 10/2002 | Vieira |
| 2003/0226837 | A1 | 12/2003 | Blake et al. |
| 2004/0118401 | A1 | 6/2004 | Smith et al. |
| 2004/0129280 | A1 | 7/2004 | Woodson et al. |
| 2004/0200488 | A1 | 10/2004 | Felter et al. |
| 2004/0226568 | A1 | 11/2004 | Takeuchi et al. |
| 2005/0016550 | A1 | 1/2005 | Katase |
| 2006/0016453 | A1 | 1/2006 | Kim |
| 2006/0196518 | A1 | 9/2006 | Hon |
| 2006/0270421 | A1 * | 11/2006 | Phillips .............. G08B 21/0236 455/457 |
| 2007/0074734 | A1 | 4/2007 | Braunshteyn et al. |
| 2007/0102013 | A1 | 5/2007 | Adams et al. |
| 2007/0215167 | A1 | 9/2007 | Crooks et al. |
| 2008/0085103 | A1 | 4/2008 | Beland et al. |
| 2008/0092912 | A1 | 4/2008 | Robinson et al. |
| 2008/0257367 | A1 | 10/2008 | Paterno et al. |
| 2008/0276947 | A1 | 11/2008 | Martzel |
| 2008/0302374 | A1 | 12/2008 | Wengert et al. |
| 2009/0095311 | A1 | 4/2009 | Hon |
| 2009/0095312 | A1 | 4/2009 | Herbrich et al. |
| 2009/0126745 | A1 | 5/2009 | Hon |
| 2009/0188490 | A1 | 7/2009 | Hon |
| 2009/0230117 | A1 | 9/2009 | Fernando et al. |
| 2009/0272379 | A1 | 11/2009 | Thorens et al. |
| 2009/0283103 | A1 | 11/2009 | Nielsen et al. |
| 2009/0320863 | A1 | 12/2009 | Fernando et al. |
| 2010/0028859 | A1 * | 2/2010 | S. Moshe ............. G01N 33/569 435/7.1 |
| 2010/0043809 | A1 | 2/2010 | Magnon |
| 2010/0083959 | A1 | 4/2010 | Siller |
| 2010/0200006 | A1 | 8/2010 | Robinson et al. |
| 2010/0229881 | A1 | 9/2010 | Hearn |
| 2010/0242974 | A1 | 9/2010 | Pan |
| 2010/0307518 | A1 | 12/2010 | Wang |
| 2010/0313901 | A1 | 12/2010 | Fernando et al. |
| 2011/0005535 | A1 | 1/2011 | Xiu |
| 2011/0011396 | A1 | 1/2011 | Fang |
| 2011/0036363 | A1 | 2/2011 | Urtsev et al. |
| 2011/0036365 | A1 | 2/2011 | Chong et al. |
| 2011/0094523 | A1 | 4/2011 | Thorens et al. |
| 2011/0126848 | A1 | 6/2011 | Zuber et al. |
| 2011/0155153 | A1 | 6/2011 | Thorens et al. |
| 2011/0155718 | A1 | 6/2011 | Greim et al. |
| 2011/0168194 | A1 | 7/2011 | Hon |
| 2011/0265806 | A1 | 11/2011 | Alarcon et al. |
| 2011/0309157 | A1 | 12/2011 | Yang et al. |
| 2012/0042885 | A1 | 2/2012 | Stone et al. |
| 2012/0060853 | A1 | 3/2012 | Robinson et al. |
| 2012/0111347 | A1 | 5/2012 | Hon |
| 2012/0132643 | A1 | 5/2012 | Choi et al. |
| 2012/0227752 | A1 | 9/2012 | Alelov |
| 2012/0231464 | A1 | 9/2012 | Yu et al. |
| 2012/0260927 | A1 | 10/2012 | Liu |

(56) References Cited

U.S. PATENT DOCUMENTS

| | | | |
|---|---|---|---|
| 2012/0279512 | A1 | 11/2012 | Hon |
| 2012/0318882 | A1 | 12/2012 | Abehasera |
| 2013/0037041 | A1 | 2/2013 | Worm et al. |
| 2013/0056013 | A1 | 3/2013 | Terry et al. |
| 2013/0081625 | A1 | 4/2013 | Rustad et al. |
| 2013/0081642 | A1 | 4/2013 | Safari |
| 2013/0192619 | A1 | 8/2013 | Tucker et al. |
| 2013/0255702 | A1 | 10/2013 | Griffith, Jr. |
| 2013/0306084 | A1 | 11/2013 | Flick |
| 2013/0319439 | A1 | 12/2013 | Gorelick et al. |
| 2013/0340750 | A1 | 12/2013 | Thorens et al. |
| 2013/0340775 | A1 | 12/2013 | Juster et al. |
| 2014/0000638 | A1 | 1/2014 | Sebastian et al. |
| 2014/0060554 | A1 | 3/2014 | Collett et al. |
| 2014/0060555 | A1 | 3/2014 | Chang et al. |
| 2014/0096781 | A1 | 4/2014 | Sears et al. |
| 2014/0096782 | A1 | 4/2014 | Ampolini et al. |
| 2014/0109921 | A1 | 4/2014 | Chen |
| 2014/0157583 | A1 | 6/2014 | Ward et al. |
| 2014/0209105 | A1 | 7/2014 | Sears et al. |
| 2014/0253144 | A1 | 9/2014 | Novak et al. |
| 2014/0261408 | A1 | 9/2014 | DePiano et al. |
| 2014/0261486 | A1 | 9/2014 | Potter et al. |
| 2014/0261487 | A1 | 9/2014 | Chapman et al. |
| 2014/0261495 | A1 | 9/2014 | Novak et al. |
| 2014/0270727 | A1 | 9/2014 | Ampolini et al. |
| 2014/0270729 | A1 | 9/2014 | DePiano et al. |
| 2014/0270730 | A1 | 9/2014 | DePiano et al. |
| 2014/0345631 | A1 | 11/2014 | Bowen et al. |
| 2015/0007838 | A1 | 1/2015 | Fernando et al. |
| 2015/0053217 | A1 | 2/2015 | Steingraber et al. |
| 2015/0128974 | A1 | 5/2015 | Hon |
| 2016/0037826 | A1 | 2/2016 | Hearn et al. |
| 2017/0156398 | A1 | 6/2017 | Sur et al. |

FOREIGN PATENT DOCUMENTS

| | | | |
|---|---|---|---|
| CN | 1541577 | | 11/2004 |
| CN | 2719043 | | 8/2005 |
| CN | 200997909 | | 1/2008 |
| CN | 101116542 | | 2/2008 |
| CN | 101176805 | | 5/2008 |
| CN | 201379072 | | 1/2010 |
| CN | 103141944 | A | 6/2013 |
| CN | 104049749 | A | 9/2014 |
| CN | 204119379 | U | 1/2015 |
| CN | 104867309 | A | 8/2015 |
| CN | 105266209 | A | 1/2016 |
| CN | 105722417 | A | 6/2016 |
| CN | 105768720 | A | 7/2016 |
| DE | 10 2006 004 484 | | 8/2007 |
| DE | 102006041042 | | 3/2008 |
| DE | 20 2009 010 400 | | 11/2009 |
| EP | 0 295 122 | | 12/1988 |
| EP | 0 430 566 | | 6/1991 |
| EP | 0 845 220 | | 6/1998 |
| EP | 1 618 803 | | 1/2006 |
| EP | 2 316 286 | | 5/2011 |
| GB | 2469850 | | 11/2010 |
| WO | WO 1997/48293 | | 12/1997 |
| WO | WO 2003/034847 | | 5/2003 |
| WO | WO 2004/043175 | | 5/2004 |
| WO | WO 2004/080216 | | 9/2004 |
| WO | WO 2005/099494 | | 10/2005 |
| WO | WO 2007/078273 | | 7/2007 |
| WO | WO 2007/131449 | | 11/2007 |
| WO | WO 2009/105919 | | 9/2009 |
| WO | WO 2009/155734 | | 12/2009 |
| WO | WO 2010/003480 | | 1/2010 |
| WO | WO 2010/045670 | | 4/2010 |
| WO | WO 2010/073122 | | 7/2010 |
| WO | WO 2010/118644 | | 10/2010 |
| WO | WO 2010/140937 | | 12/2010 |
| WO | WO 2011/010334 | | 1/2011 |
| WO | WO 2012/062600 | | 5/2012 |
| WO | WO 2012/072762 | | 6/2012 |
| WO | WO 2012/100523 | | 8/2012 |
| WO | WO 2013/089551 | | 6/2013 |
| WO | WO 2015/168588 | | 5/2015 |

OTHER PUBLICATIONS

Analog Devices, "ADZS-BF707-BLIP2 Board Evaluation System Manual", Analog Devices, Inc., Part No. 82-100126-01, pp. 1-60, Apr. 2015.

Analog Device, "Blackfin Low Power Imaging Platform (BLIP) a Revolutionary Advanced Occupancy Sensing Solution",analog.com, pp. 1-2, Retrieved Nov. 4, 2014.

Analog Devices, "Low Power, Small Form Factor Video Analytics Camera", Preliminary Sheet ADIS17001, pp. 1-2, Last Content Update Mar. 15, 2017.

* cited by examiner

VIDEO ANALYTICS CAMERA SYSTEM FOR AN AEROSOL DELIVERY DEVICE

CROSS-REFERENCE TO RELATED APPLICATIONS

This application is a continuation of U.S. application Ser. No. 15/651,521, filed Jul. 17, 2017, the entire disclosure of which is hereby incorporated by reference herein in its entirety.

TECHNOLOGICAL FIELD

The present disclosure relates to aerosol delivery devices such as smoking articles, and more particularly to aerosol delivery devices that may utilize electrically generated heat for the production of aerosol (e.g., smoking articles commonly referred to as electronic cigarettes). The smoking articles may be configured to heat an aerosol precursor, which may incorporate materials that may be made or derived from, or otherwise incorporate tobacco, the precursor being capable of forming an inhalable substance for human consumption.

BACKGROUND

Many devices have been proposed through the years as improvements upon, or alternatives to, smoking products that require combusting tobacco for use. Many of those devices purportedly have been designed to provide the sensations associated with cigarette, cigar or pipe smoking, but without delivering considerable quantities of incomplete combustion and pyrolysis products that result from the burning of tobacco. To this end, there have been proposed numerous alternative smoking products, flavor generators and medicinal inhalers that utilize electrical energy to vaporize or heat a volatile material, or attempt to provide the sensations of cigarette, cigar or pipe smoking without burning tobacco to a significant degree. See, for example, the various alternative smoking articles, aerosol delivery devices and heat generating sources set forth in the background art described in U.S. Pat. No. 8,881,737 to Collett et al., U.S. Pat. App. Pub. No. 2013/0255702 to Griffith Jr. et al., U.S. Pat. App. Pub. No. 2014/0000638 to Sebastian et al., U.S. Pat. App. Pub. No. 2014/0096781 to Sears et al., U.S. Pat. App. Pub. No. 2014/0096782 to Ampolini et al., U.S. Pat. App. Pub. No. 2015/0059780 to Davis et al., and U.S. patent application Ser. No. 15/222,615 to Watson et al., filed Jul. 28, 2016, all of which are incorporated herein by reference. See also, for example, the various implementations of products and heating configurations described in the background sections of U.S. Pat. No. 5,388,594 to Counts et al. and U.S. Pat. No. 8,079,371 to Robinson et al., which are incorporated by reference. Additional examples of smoking articles are described in U.S. Pat. No. 5,388,574 to Ingebrethsen, EP Pat. App. Pub. No. 1,618,803 to Hon, PCT Pat. App. Pub. No. WO 2012/062600 to Andersson et al., and U.S. Pat. App. Pub. No. 2015/0128974 to Hon, all of which are incorporated herein by reference.

However, it may be desirable to provide aerosol delivery devices with improved electronics such as may extend usability of the devices.

BRIEF SUMMARY

The present disclosure relates to aerosol delivery devices, methods of forming such devices, and elements of such devices. The present disclosure includes, without limitation, the following example implementations.

Some example implementations provide an aerosol delivery device comprising a cartridge of aerosol precursor composition; and a control body coupled or coupleable to the cartridge, the control body including a control component configured to control delivery of components of the aerosol precursor composition in response to detection of airflow through at least a portion of the cartridge or control body, and including a camera system with a digital camera configured to capture video imagery of a scene in a field of view thereof, wherein the camera system or the control component is configured to perform video content analytics on the video imagery to detect a temporal or spatial event in the scene, and transfer at least one of the video imagery or information indicative of the temporal or spatial event externally to a computing device configured to store or display the video imagery or information, or perform at least one control operation based on the information.

In some example implementations of the aerosol delivery device of any preceding or any subsequent example implementation, or any combination thereof, the camera system further includes a processor configured to perform the video content analytics on the video imagery, and the control component is configured to transfer at least one of the video imagery or information to the computing device.

In some example implementations of the aerosol delivery device of any preceding or any subsequent example implementation, or any combination thereof, the temporal or spatial event is a number of people in a room climate controlled by a heating or cooling system, and the computing device is a network-connected thermostat of or coupled to the heating or cooling system, and wherein the camera system or the control component being configured to transfer at least one of the video imagery or information includes being configured to transfer information indicative of the number of people in the room to the network-connected thermostat configured to perform at least one control operation including control of the heating or cooling system based thereon.

In some example implementations of the aerosol delivery device of any preceding or any subsequent example implementation, or any combination thereof, the temporal or spatial event is a person in an environment with an electric light, and wherein the camera system or the control component being configured to transfer at least one of the video imagery or information includes being configured to transfer information indicative of the person in the environment to the computing device configured to perform at least one control operation including control of the at least one electric light based thereon.

In some example implementations of the aerosol delivery device of any preceding or any subsequent example implementation, or any combination thereof, the electric light is a network-connected electric light with the computing device embedded therein, and the camera system or control component being configured to transfer the information includes being configured to transfer the information to the network-connected electric light.

In some example implementations of the aerosol delivery device of any preceding or any subsequent example implementation, or any combination thereof, the computing device is a network-connected light switch coupled to the electric light, and the camera system or control component being configured to transfer the information includes being configured to transfer the information to the network-connected light switch.

In some example implementations of the aerosol delivery device of any preceding or any subsequent example implementation, or any combination thereof, the temporal or spatial event is a person or number of people in an environment, and wherein the camera system or the control component being configured to transfer at least one of the video imagery or information includes being configured to transfer information indicative of the person or number of people in the environment to the computing device configured to perform at least one control operation including output of a notification of the person or number of people in the environment.

In some example implementations of the aerosol delivery device of any preceding or any subsequent example implementation, or any combination thereof, the camera system or the control component being configured to transfer at least one of the video imagery or information includes being configured to transfer the video imagery and information indicative of the person or number of people in the environment to the computing device configured to perform at least one control operation including output of the notification that includes display of the video imagery with a visual indicator of the person or number of people thereon.

In some example implementations of the aerosol delivery device of any preceding or any subsequent example implementation, or any combination thereof, the temporal or spatial event is a person or number of people in an environment, and wherein the camera system or the control component is configured to transfer at least one of the video imagery or information in response to a second temporal or spatial event in the environment, the camera system or the control component being configured to transfer an indication of the second temporal or spatial event with the video imagery or information, and the second temporal or spatial event including a hazardous condition in the environment.

In some example implementations of the aerosol delivery device of any preceding or any subsequent example implementation, or any combination thereof, the temporal or spatial event is a person in an environment, and the camera system or the control component being configured to perform video content analytics includes being configured to detect a facial expression of the person, and wherein the camera system or the control component is configured to transfer at least one of the video imagery or information in response to a second temporal or spatial event, the camera system or the control component being configured to transfer an indication of the second temporal or spatial event with the video imagery or information, and the second temporal or spatial event including distress detected based on the facial expression of the person.

In some example implementations of the aerosol delivery device of any preceding or any subsequent example implementation, or any combination thereof, the scene is a parking lot including a layout of parking spaces, the temporal or spatial event in the scene is an open one of the parking spaces, and wherein the camera system or the control component being configured to transfer at least one of the video imagery or information includes being configured to transfer the video imagery and information indicative of the open one of the parking spaces to the computing device configured to perform at least one control operation including display of the video imagery with a visual indicator of the open one of the parking spaces thereon.

In some example implementations of the aerosol delivery device of any preceding or any subsequent example implementation, or any combination thereof, the housing is coupled to the cartridge including a reservoir of aerosol precursor composition comprising glycerin and nicotine.

Some example implementations provide a control body of an aerosol delivery device, the control body comprising a housing to which a cartridge of aerosol precursor composition is coupled or coupleable to form the aerosol delivery device; a control component contained within the housing and configured to control delivery of components of the aerosol precursor composition in response to detection of airflow through at least a portion of the housing or cartridge; and a camera system with a digital camera configured to capture video imagery of a scene in a field of view thereof, wherein the camera system or the control component is configured to perform video content analytics on the video imagery to detect a temporal or spatial event in the scene, and transfer at least one of the video imagery or information indicative of the temporal or spatial event externally to a computing device configured to store or display the video imagery or information, or perform at least one control operation based on the information.

In some example implementations of the control body of any preceding or any subsequent example implementation, or any combination thereof, the camera system further includes a processor configured to perform the video content analytics on the video imagery, and the control component is configured to transfer at least one of the video imagery or information to the computing device.

In some example implementations of the control body of any preceding or any subsequent example implementation, or any combination thereof, the temporal or spatial event is a number of people in a room climate controlled by a heating or cooling system, and the computing device is a network-connected thermostat of or coupled to the heating or cooling system, and wherein the camera system or the control component being configured to transfer at least one of the video imagery or information includes being configured to transfer information indicative of the number of people in the room to the network-connected thermostat configured to perform at least one control operation including control of the heating or cooling system based thereon.

In some example implementations of the control body of any preceding or any subsequent example implementation, or any combination thereof, the temporal or spatial event is a person in an environment with an electric light, and wherein the camera system or the control component being configured to transfer at least one of the video imagery or information includes being configured to transfer information indicative of the person in the environment to the computing device configured to perform at least one control operation including control of the at least one electric light based thereon.

In some example implementations of the control body of any preceding or any subsequent example implementation, or any combination thereof, the electric light is a network-connected electric light with the computing device embedded therein, and the camera system or control component being configured to transfer the information includes being configured to transfer the information to the network-connected electric light.

In some example implementations of the control body of any preceding or any subsequent example implementation, or any combination thereof, the computing device is a network-connected light switch coupled to the electric light, and the camera system or control component being configured to transfer the information includes being configured to transfer the information to the network-connected light switch.

In some example implementations of the control body of any preceding or any subsequent example implementation, or any combination thereof, the temporal or spatial event is a person or number of people in an environment, and wherein the camera system or the control component being configured to transfer at least one of the video imagery or information includes being configured to transfer information indicative of the person or number of people in the environment to the computing device configured to perform at least one control operation including output of a notification of the person or number of people in the environment.

In some example implementations of the control body of any preceding or any subsequent example implementation, or any combination thereof, the camera system or the control component being configured to transfer at least one of the video imagery or information includes being configured to transfer the video imagery and information indicative of the person or number of people in the environment to the computing device configured to perform at least one control operation including output of the notification that includes display of the video imagery with a visual indicator of the person or number of people thereon.

In some example implementations of the control body of any preceding or any subsequent example implementation, or any combination thereof, the temporal or spatial event is a person or number of people in an environment, and wherein the camera system or the control component is configured to transfer at least one of the video imagery or information in response to a second temporal or spatial event in the environment, the camera system or the control component being configured to transfer an indication of the second temporal or spatial event with the video imagery or information, and the second temporal or spatial event including a hazardous condition in the environment.

In some example implementations of the control body of any preceding or any subsequent example implementation, or any combination thereof, the temporal or spatial event is a person in an environment, and the camera system or the control component being configured to perform video content analytics includes being configured to detect a facial expression of the person, and wherein the camera system or the control component is configured to transfer at least one of the video imagery or information in response to a second temporal or spatial event, the camera system or the control component being configured to transfer an indication of the second temporal or spatial event with the video imagery or information, and the second temporal or spatial event including distress detected based on the facial expression of the person.

In some example implementations of the control body of any preceding or any subsequent example implementation, or any combination thereof, the scene is a parking lot including a layout of parking spaces, the temporal or spatial event in the scene is an open one of the parking spaces, and wherein the camera system or the control component being configured to transfer at least one of the video imagery or information includes being configured to transfer the video imagery and information indicative of the open one of the parking spaces to the computing device configured to perform at least one control operation including display of the video imagery with a visual indicator of the open one of the parking spaces thereon.

In some example implementations of the control body of any preceding or any subsequent example implementation, or any combination thereof, the housing is coupled to the cartridge including a reservoir of aerosol precursor composition comprising glycerin and nicotine.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described the disclosure in the foregoing general terms, reference will now be made to the accompanying drawings, which are not necessarily drawn to scale, and wherein:

FIG. 1 illustrates a front view of an aerosol delivery device including a housing having a cartridge therein, according to an example implementation of the present disclosure;

FIG. 2 schematically illustrates a sectional view through the aerosol delivery device, according to an example implementation;

DETAILED DESCRIPTION

Figure 1:
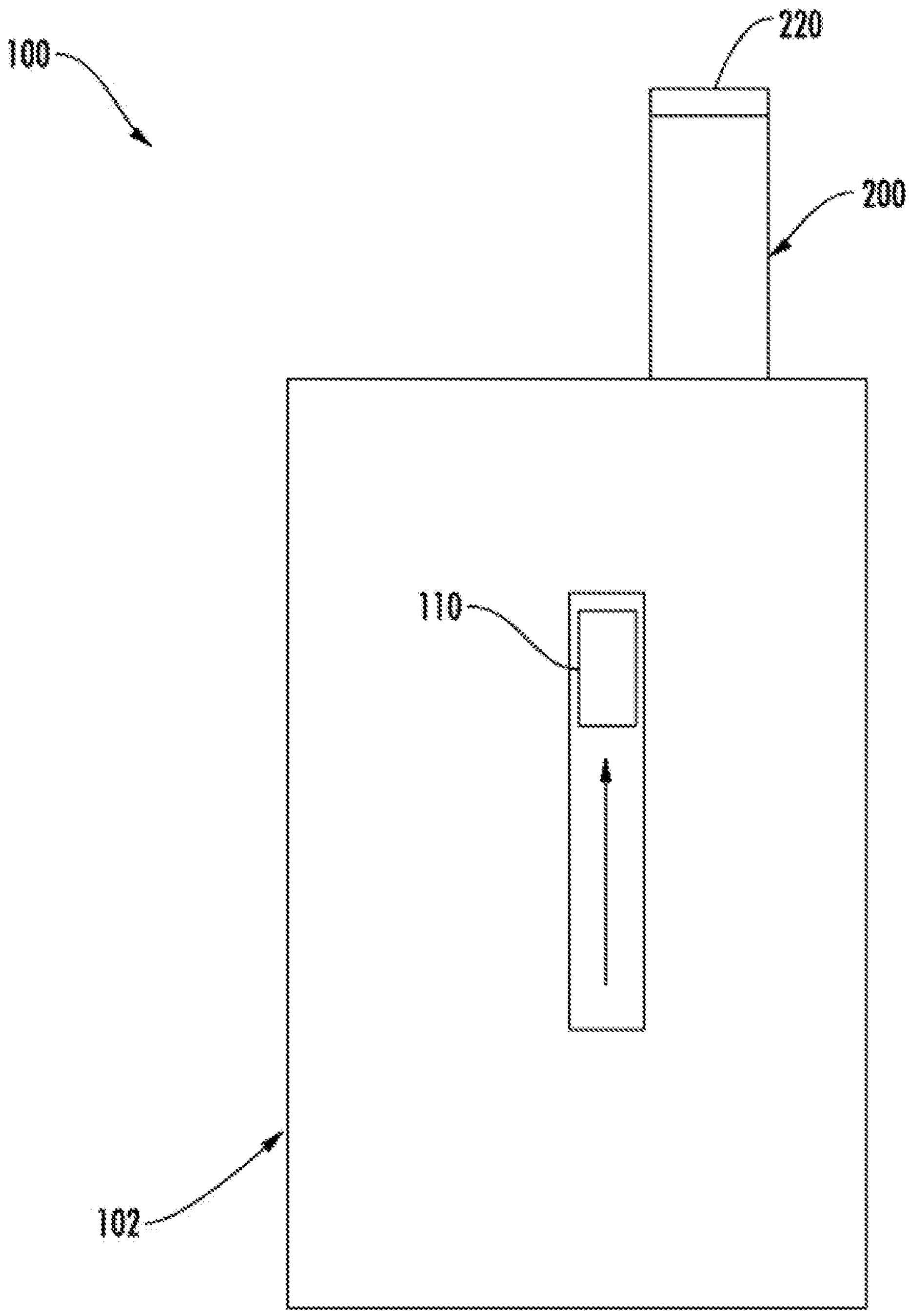

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. As used in the specification and the appended claims, the singular forms "a," "an," "the" and the like include plural referents unless the context clearly dictates otherwise.

As described hereinafter, example implementations of the present disclosure relate to aerosol delivery devices. Aerosol delivery devices according to the present disclosure use electrical energy to heat a material (preferably without combusting the material to any significant degree) to form an inhalable substance; and components of such devices have the form of articles most preferably are sufficiently compact to be considered hand-held devices. That is, use of components of preferred aerosol delivery devices does not result in the production of smoke in the sense that aerosol results principally from by-products of combustion or pyrolysis of tobacco, but rather, use of those preferred devices results in the production of vapors resulting from volatilization or vaporization of certain components incorporated therein. In some example implementations, components of aerosol delivery devices may be characterized as electronic cigarettes, and those electronic cigarettes most preferably incorporate tobacco and/or components derived from tobacco, and hence deliver tobacco derived components in aerosol form.

Aerosol generating pieces of certain preferred aerosol delivery devices may provide many of the sensations (e.g., inhalation and exhalation rituals, types of tastes or flavors, organoleptic effects, physical feel, use rituals, visual cues such as those provided by visible aerosol, and the like) of smoking a cigarette, cigar or pipe that is employed by lighting and burning tobacco (and hence inhaling tobacco smoke), without any substantial degree of combustion of any component thereof. For example, the user of an aerosol generating piece of the present disclosure can hold and use that piece much like a smoker employs a traditional type of smoking article, draw on one end of that piece for inhalation of aerosol produced by that piece, take or draw puffs at selected intervals of time, and the like.

While the systems are generally described herein in terms of implementations associated with aerosol delivery devices such as so-called "e-cigarettes," it should be understood that the mechanisms, components, features, and methods may be embodied in many different forms and associated with a variety of articles. For example, the description provided herein may be employed in conjunction with implementations of traditional smoking articles (e.g., cigarettes, cigars, pipes, etc.), heat-not-burn cigarettes, and related packaging for any of the products disclosed herein. Accordingly, it should be understood that the description of the mechanisms, components, features, and methods disclosed herein are discussed in terms of implementations relating to aerosol delivery devices by way of example only, and may be embodied and used in various other products and methods.

Aerosol delivery devices of the present disclosure also can be characterized as being vapor-producing articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like.

In use, aerosol delivery devices of the present disclosure may be subjected to many of the physical actions employed by an individual in using a traditional type of smoking article (e.g., a cigarette, cigar or pipe that is employed by lighting and inhaling tobacco). For example, the user of an aerosol delivery device of the present disclosure can hold that article much like a traditional type of smoking article, draw on one end of that article for inhalation of aerosol produced by that article, take puffs at selected intervals of time, etc.

Aerosol delivery devices of the present disclosure generally include a number of components provided within an outer body or shell, which may be referred to as a housing. The overall design of the outer body or shell can vary, and the format or configuration of the outer body that can define the overall size and shape of the aerosol delivery device can vary. Typically, an elongated body resembling the shape of a cigarette or cigar can be a formed from a single, unitary housing or the elongated housing can be formed of two or more separable bodies. For example, an aerosol delivery device can comprise an elongated shell or body that can be substantially tubular in shape and, as such, resemble the shape of a conventional cigarette or cigar.

In one example, all of the components of the aerosol delivery device are contained within one housing. Alternatively, an aerosol delivery device can comprise two or more housings that are joined and are separable. For example, an aerosol delivery device can possess at one end a control body comprising a housing containing one or more reusable components (e.g., an accumulator such as a rechargeable (e.g., Lithium Ion) battery, solid-state battery, thin-film solid-state battery and/or supercapacitor, and various electronics for controlling the operation of that article), and at the other end and removably coupleable thereto, an outer body or shell containing a disposable portion (e.g., a disposable flavor-containing cartridge). More specific formats, configurations and arrangements of components within the single housing type of unit or within a multi-piece separable housing type of unit will be evident in light of the further disclosure provided herein. Additionally, various aerosol delivery device designs and component arrangements can be appreciated upon consideration of the commercially available electronic aerosol delivery devices.

Aerosol delivery devices of the present disclosure most preferably comprise some combination of a power source (i.e., an electrical power source), at least one control component (e.g., means for actuating, controlling, regulating and ceasing power for heat generation, such as by controlling electrical current flow the power source to other components of the article—e.g., a microprocessor, individually or as part of a microcontroller), a heater or heat generation member (e.g., an electrical resistance heating element or other component) or vibrating piezoelectric or piezomagneteic mesh, which alone or in combination with one or more further elements may be commonly referred to as an "atomizer," an aerosol precursor composition (e.g., commonly a liquid capable of yielding an aerosol upon application of sufficient heat, such as ingredients commonly referred to as "smoke juice," "e-liquid" and "e-juice"), and a mouthend region or tip for allowing draw upon the aerosol delivery device for aerosol inhalation (e.g., a defined airflow path through the article such that aerosol generated can be withdrawn therefrom upon draw).

Alignment of the components within the aerosol delivery device of the present disclosure can vary. In specific implementations, the aerosol precursor composition can be located near an end of the aerosol delivery device which may be configured to be positioned proximal to the mouth of a user so as to maximize aerosol delivery to the user. Other configurations, however, are not excluded. Generally, the heating element can be positioned sufficiently near the aerosol precursor composition so that heat from the heating element can volatilize the aerosol precursor (as well as one or more flavorants, medicaments, or the like that may likewise be provided for delivery to a user) and form an aerosol for delivery to the user. When the heating element heats the aerosol precursor composition, an aerosol is formed, released, or generated in a physical form suitable for inhalation by a consumer. It should be noted that the foregoing terms are meant to be interchangeable such that reference to release, releasing, releases, or released includes form or generate, forming or generating, forms or generates, and formed or generated. Specifically, an inhalable substance is released in the form of a vapor or aerosol or mixture thereof, wherein such terms are also interchangeably used herein except where otherwise specified.

As noted above, the aerosol delivery device may incorporate a battery or other electrical power source (e.g., rechargeable lithium-ion battery (LiB)) to provide current flow sufficient to provide various functionalities to the aerosol delivery device, such as powering of a heater, powering of control systems, powering of indicators, and the like. The power source can take on various implementations. Preferably, the power source is able to deliver sufficient power to rapidly heat the heating element to provide for aerosol formation and power the aerosol delivery device through use for a desired duration of time. The power source preferably is sized to fit conveniently within the aerosol delivery device so that the aerosol delivery device can be easily handled. Additionally, a preferred power source is of a sufficiently light weight to not detract from a desirable smoking experience.

More specific formats, configurations and arrangements of components within the aerosol delivery devices of the present disclosure will be evident in light of the further disclosure provided hereinafter. Additionally, the selection and arrangement of various aerosol delivery device components can be appreciated upon consideration of commercially-available electronic aerosol delivery devices. Further information regarding formats, configurations and arrangements of components within the aerosol delivery devices of the present disclosure, as well as commercially-available electronic aerosol delivery devices, may be found in PCT Pat. App. Pub. No. WO 2015/168588 to Ademe et al., and U.S. patent application Ser. No. 15/291,771 to Sur et al., filed Oct. 12, 2016, which are incorporated herein by reference.

Figure 2:
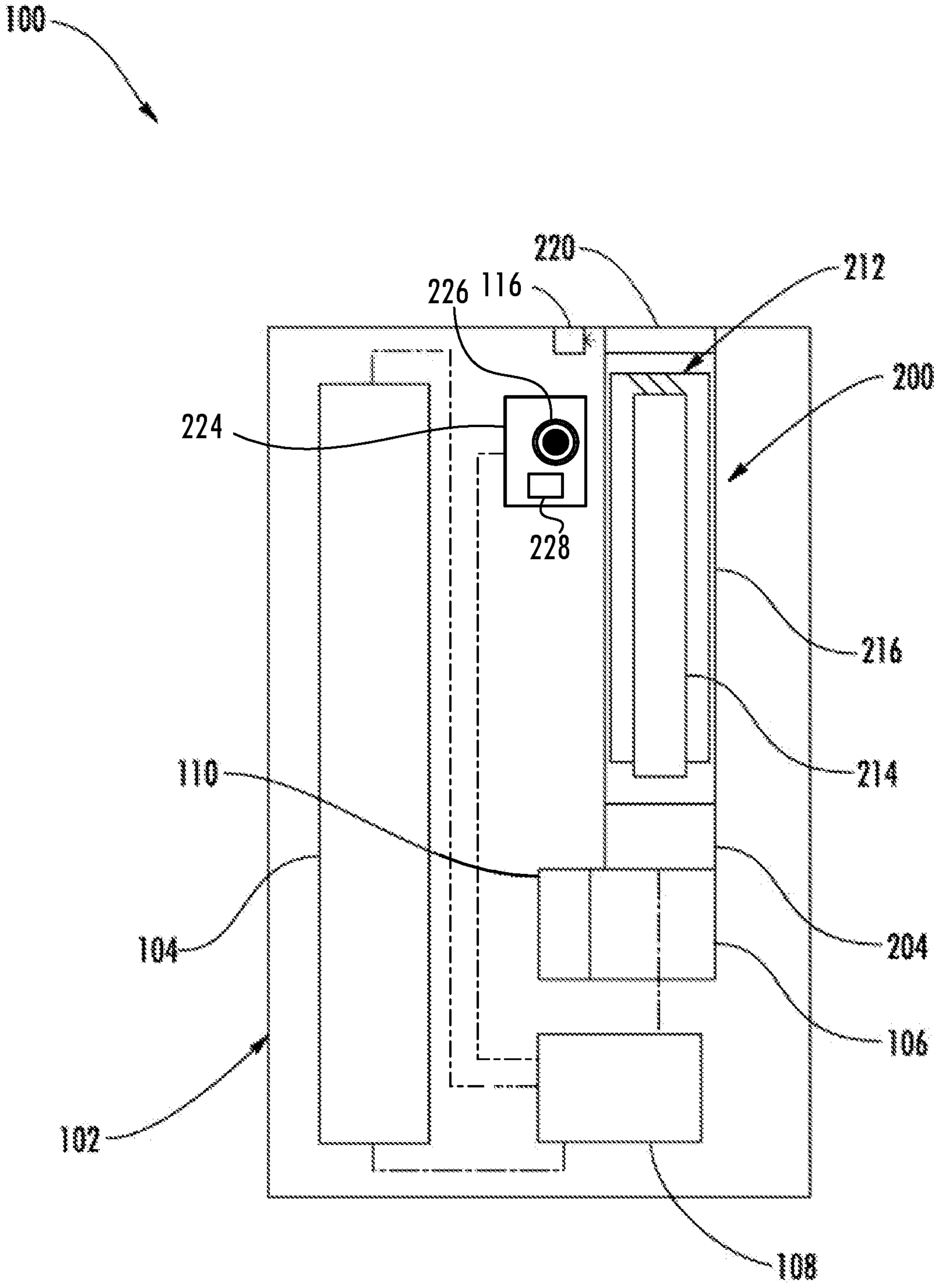

FIG. 1 illustrates a front view of an aerosol delivery device 100, and FIG. 2 illustrates a modified sectional view through the aerosol delivery device, according to an example implementation of the present disclosure. As illustrated, the aerosol delivery device may comprise a control body 102 and a cartridge 200 each of which may have a respective housing. The cartridge may be moveable with respect to at least a portion of, or an entirety of, the control body. In particular, the cartridge may be moveable relative to at least a portion of the control body between an extended configuration illustrated in FIG. 1, and a retracted configuration illustrated in FIG. 2. Details with respect to the mechanisms and manners associated with movement of the cartridge relative to the control body are described hereinafter.

In some example implementations, one or both of the control body 102 or the cartridge 200 of the aerosol delivery device 100 may be referred to as being disposable or as being reusable. The aerosol delivery device may include various other components disposed within the control body or cartridge or otherwise coupled thereto. These components may be distributed between the control body and the cartridge in any of various manners. For example, the control body may include a replaceable battery or a rechargeable battery, solid-state battery, thin-film solid-state battery or the like, and thus may be combined with any type of recharging technology, including connection to a typical wall outlet, connection to a car charger (i.e., a cigarette lighter receptacle), connection to a computer, such as through a universal serial bus (USB) cable or connector, connection to a photovoltaic cell (sometimes referred to as a solar cell) or solar panel of solar cells, wireless connection to a Radio Frequency (RF), wireless connection to induction-based charging pads, or connection to a RF-to-DC converter. In some examples, the control body may be equipped with energy harvesting technology such as that in which energy is transmitted using Bluetooth low energy (Bluetooth LE). Further, in some example implementations, the cartridge may comprise a single-use cartridge, as disclosed in U.S. Pat. No. 8,910,639 to Chang et al., which is incorporated herein by reference. Accordingly, it should be understood that the described implementations are provided for example purposes only.

In one example implementation, the control body 102 and cartridge 200 forming the aerosol delivery device 100 may be permanently coupled to one another. Examples of aerosol delivery devices that may be configured to be disposable and/or which may include first and second outer bodies that are configured for permanent coupling are disclosed in U.S. Pat. Pub. No. 2015/0216232 to Bless et al., which is incorporated herein by reference. In another example implementation, the control body and cartridge may be configured in a single-piece, non-detachable form and may incorporate the components, aspects, and features disclosed herein. However, in another example implementation, the control body and cartridge may be configured to be separable such that, for example, the cartridge may be refilled or replaced.

By way of example, in the illustrated implementation of FIG. 2, the aerosol delivery device 100 includes a power source 104 positioned within the control body 102. The power source may include, for example, a battery (single-use or rechargeable), rechargeable supercapacitor, rechargeable solid-state battery (SSB), rechargeable LiB, or some combination thereof. Some examples of a suitable power source are provided in U.S. Pat. App. Pub. No. 2017/0112191 to Sur et al., which is incorporated by reference. Other examples of a suitable power source are provided in U.S. Pat. App. Pub. No. 2014/0283855 to Hawes et al., U.S. Pat. App. Pub. No. 2014/0014125 to Fernando et al., U.S. Pat. App. Pub. No. 2013/0243410 to Nichols et al., U.S. Pat. App. Pub. No. 2010/0313901 to Fernando et al., and U.S. Pat. App. Pub. No. 2009/0230117 to Fernando et al., all of which are incorporated herein by reference. Further, a connector 106 may be moveably attached to the control body. The cartridge 200 may be engaged with the connector so as to be moveable relative to at least a portion of the control body. In some implementations, the cartridge may be removably engaged with the connector and replaceable. And in some implementations, the cartridge may be equipped with a near field communication (NFC) tag capable of very high frequency (VHF) or ultra high frequency (UHF) communication for authentication of the cartridge, such as in a manner disclosed in U.S. patent application Ser. No. 15/352,199 to Sur et al., filed Nov. 15, 2016, the disclosures of which are incorporated herein by reference.

The aerosol delivery device 100 may include a control component 108 received therein. The control component may be configured to direct electrical power from the power source 104 to the cartridge 200 to heat aerosol precursor composition retained in the cartridge to produce a vapor, which may occur during a user draw on a mouthpiece 220 of the cartridge. The control component includes a number of electronic components, and in some examples may be formed of a printed circuit board (PCB) that supports and electrically connects the electronic components. Examples of suitable electronic components include a microprocessor, low-quiescent power microprocessor or processor core, an integrated circuit (IC), a memory, and the like. In some examples, the control component may include a microcontroller with an integrated processor core and memory, and which may further include one or more integrated input/output peripherals.

In some examples, the control component 108 includes or is coupled to a communication interface to enable wireless communication with one or more networks, computing devices or other appropriately-enabled devices. The communication interface may include, for example, an antenna (or multiple antennas) and supporting hardware and/or software for enabling wireless communication with a communication network (e.g., a cellular network, Wi-Fi, WLAN, and/or the like), and/or for supporting device-to-device, short-range communication, in accordance with a desired communication technology. In some examples, the communication interface includes an antenna with increased tracking for higher transmission of data using software and a configuration of four capacitors. Examples of suitable short-range communication technologies that may be supported by the communication interface include various near field communication (NFC) technologies, wireless personal area network (WPAN) technologies and the like. More particular examples of suitable WPAN technologies include those specified by IEEE 802.16 standards or otherwise, including Bluetooth, Bluetooth LE, ZigBee, infrared (e.g., IrDA), radio-frequency identification (RFID), Wireless USB and the like. Yet other examples of suitable short-range communication technologies include Wi-Fi Direct, as well as certain other technologies based on or specified by IEEE 802.11 and/or IEEE 802.15.4 standards and that support direct device-to-device communication.

Examples of suitable communication interfaces are disclosed in U.S. Pat. App. Pub. No. 2016/0261020 to Marion et al., the content of which is incorporated herein by reference. Another example of a suitable communication interface is the CC3200 single chip wireless microcontroller unit (MCU) from Texas Instruments. And examples of suitable manners according to which the aerosol delivery device 100 may be configured to wirelessly communicate are disclosed in U.S. Pat. App. Pub. No. 2016/0007651 to Ampolini et al., and U.S. Pat. App. Pub. No. 2016/0219933 to Henry, Jr. et al., each of which is incorporated herein by reference.

As explained in greater detail below, the aerosol delivery device may additionally include a camera system 224 including a digital camera 226 and supporting electronic components, which in some examples may be formed of a PCB that supports and electrically connects the electronic components. The digital camera may be configured to capture video imagery of a scene in its field of view. The camera system or the control component 108 of the aerosol delivery device 100 is configured to perform video content analytics on the video imagery to detect a temporal or spatial event in the scene. The camera system or the control component is also configured to transfer the video imagery and/or information indicative of the temporal or spatial event externally to a computing device configured to store or display the video imagery or information, or perform at least one control operation based on the information. In some examples, the camera system further includes a processor 228 such as a digital signal processor (DSP) configured to perform the video content analytics on the video imagery, and the control component is configured to transfer at least one of the video imagery or information to the computing device.

The camera system 224 is shown separate and distinct from the control component 108. In some examples, at least some of the supporting electronic components of the camera system may be provided by the control component, which may control operation of both the aerosol delivery device and digital camera. In other examples, the camera system may control operation of the digital camera separate and distinct from the control component's control of the aerosol delivery device. One example of a suitable camera system that may operate separate and distinct from the control component is the ADIS1700x video analytics camera from Analog Devices. Other examples of a suitable camera system include Blackfin® Low Power Imaging Platform (BLIP) systems and BLIP2 systems from Analog Devices.

As noted above, the cartridge 200 may be moveable relative to the control body 102. In this regard, the aerosol delivery device 100 may further comprise an actuator 110. In particular, the actuator may be coupled to the connector 106. Thereby, the actuator may be operatively engaged with the cartridge and configured to move the cartridge between the extended configuration and the retracted configuration.

As illustrated in FIG. 1, the mouthpiece 220 may be exposed when the cartridge 200 is in the extended configuration. In other words the mouthpiece may be positioned outside of the control body 102 when the cartridge is in the extended configuration such that a user may engage the mouthpiece with his or her lips. Thus, the extended configuration of the cartridge is a configuration in which the aerosol delivery device 100 is configured to receive a draw on the mouthpiece such that the aerosol delivery device may produce and deliver an aerosol to a user in the manner described above.

Conversely, as illustrated in FIG. 2, in the retracted configuration the mouthpiece 220 is relatively closer to the control body 102 than in the extended configuration of FIG. 1. In the retracted configuration, the mouthpiece may be flush with respect to the control body. In other words, an outer surface of the mouthpiece may substantially align with an outer surface of the control body. In another implementation the mouthpiece may be recessed with respect to the control body. In other words, a gap may be provided between the outer surface of the mouthpiece and the outer surface of the control body.

Figure 3:
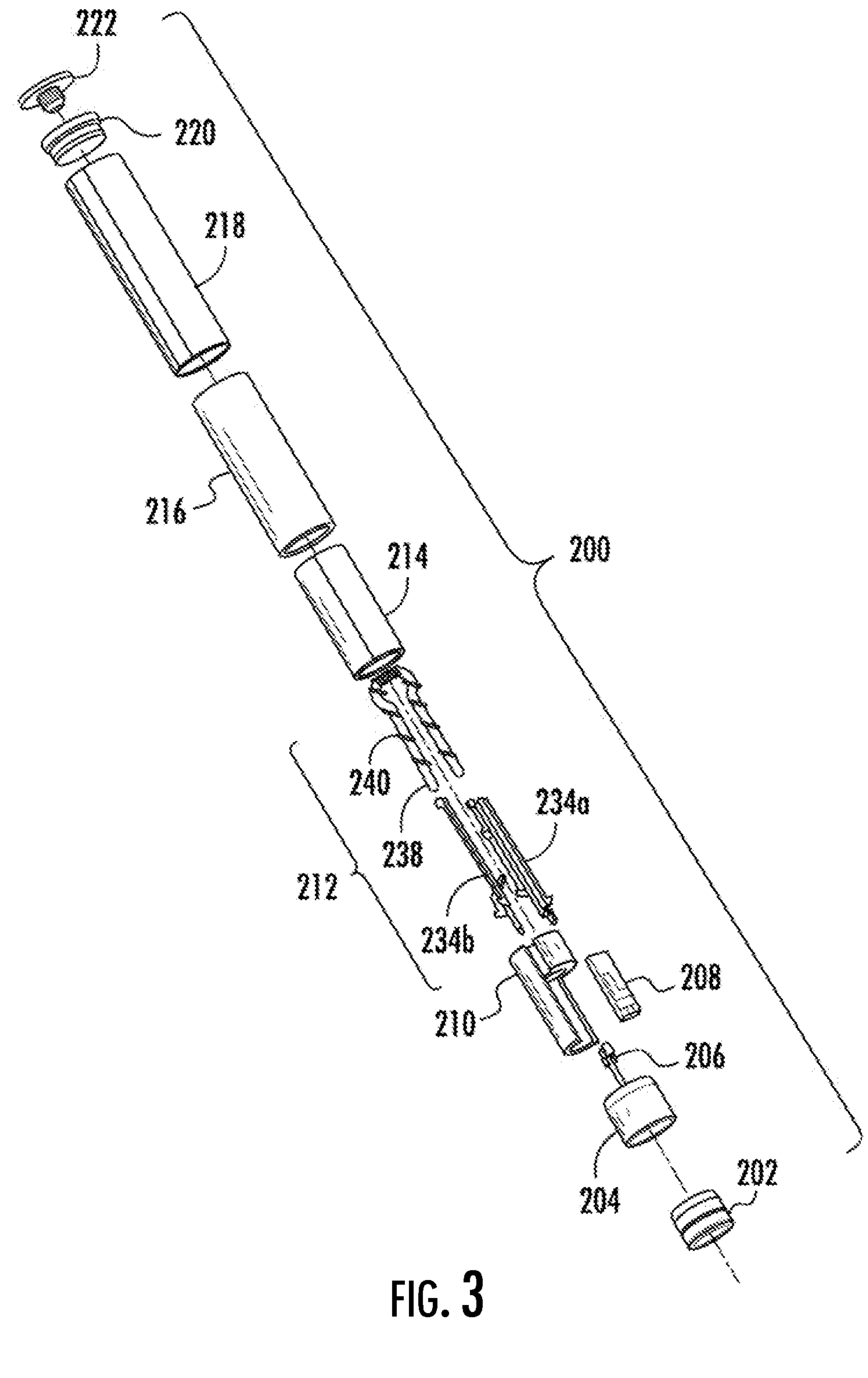
FIG. 3 illustrates an exploded view of a cartridge suitable for use in the aerosol delivery device, according to an example implementation.

FIG. 3 illustrates a more particular example of the cartridge 200 of FIGS. 1 and 2. As illustrated, the cartridge may comprise a base shipping plug 202, a base 204, a control component terminal 206, an electronic control component 208, a flow tube 210, an atomizer 212, a reservoir 214, an outer body 216, a label 218, the mouthpiece 220, and a mouthpiece shipping plug 222 according to an example implementation of the present disclosure. In various configurations, this structure may be referred to as a tank; and accordingly, the terms "cartridge," "tank" and the like may be used interchangeably to refer to an outer body or other housing enclosing a reservoir for aerosol precursor composition, and as described below, including a heater (sometimes referred to as a heating element).

The base 204 may be coupled to a first end of the outer body 216 and the mouthpiece 220 may be coupled to an opposing second end of the outer body to at least partially enclose the remaining components of the cartridge 200 therein, with the exception of the label 218, the mouthpiece shipping plug 222, and the base shipping plug 202. The base may be configured to engage an associated device including a power source 104. In some implementations, the base may comprise anti-rotation features that substantially prevent relative rotation between the cartridge and associated device including the power source. The base shipping plug may be configured to engage and protect the base prior to use of the cartridge. Similarly, the mouthpiece shipping plug may be configured to engage and protect the mouthpiece prior to use of the cartridge.

The control component terminal 206, the electronic control component 208, the flow tube 210, the atomizer 212, and the reservoir substrate 214 may be retained within the outer body 216. The label 218 may at least partially surround the outer body and include information such as a product identifier thereon. The atomizer 212 may comprise a first heating terminal 234*a* and a second heating terminal 234*b*, a liquid transport element 238 and a heating element 240.

In some example, a valve may be positioned between the reservoir and the heating element, and configured to control an amount of aerosol precursor composition passed or delivered from the reservoir to the heating element.

The reservoir 214 may be a container or can be a fibrous reservoir, as presently described. For example, the reservoir may comprise one or more layers of nonwoven fibers substantially formed into the shape of a tube encircling the interior of the cartridge 200. An aerosol precursor composition can be retained in the reservoir. Liquid components, for example, can be sorptively retained by the reservoir. The reservoir can be in fluid connection with the liquid transport element 238 adapted to wick or otherwise transport an aerosol precursor composition stored in the reservoir housing to the heating element 240. In particular, the liquid transport element can transport the aerosol precursor composition stored in the reservoir via capillary action to the heating element that is in the form of a metal wire coil in this example. As such, the heating element is in a heating arrangement with the liquid transport element.

In some examples, a microfluidic chip may be embedded in the reservoir 214, and the aerosol precursor composition in the reservoir may be controlled by a micro pump, such as one based on microelectromechanical systems (MEMS) technology. The heating element 240 may be configured to implement radio-frequency inductive based heating of the aerosol precursor compsotion without a wick or physical contact with the aerosol precursor composition, such as in a manner described in U.S. Pat. App. Pub. No. 2017/0127722 to Davis et al., which is incorporated by reference. Other example implementations of reservoirs and transport elements useful in aerosol delivery devices according to the present disclosure are further described below, and such reservoirs and/or transport elements can be incorporated into devices such as illustrated in FIG. 3 as described herein. In particular, specific combinations of heating members and transport elements as further described below may be incorporated into devices such as illustrated in FIG. 3 as described herein.

Various examples of materials configured to produce heat when electrical current is applied therethrough may be employed to form the heating element 240. The heating element in these examples may be resistive heating element such as a wire coil, micro heater or the like. Example materials from which the heating element may be formed include Kanthal (FeCrAl), Nichrome, stainless steel, Molybdenum disilicide ($MoSi_2$), molybdenum silicide (MoSi), Molybdenum disilicide doped with Aluminum ($Mo(Si,Al)_2$), graphite and graphite-based materials (e.g., carbon-based foams and yarns) and ceramics (e.g., positive or negative temperature coefficient ceramics). Example implementations of heaters or heating elements useful in aerosol delivery devices according to the present disclosure are further described below, and can be incorporated into devices such as those described herein.

The cartridge 200 may include a flow director defining a non-tubular configuration, an electronics compartment sealed with respect to a reservoir compartment, and/or any of the various other features and components disclosed therein. Accordingly, it should be understood that the particular implementation of the cartridge described herein is provided for example purposes only. In this regard, the cartridge is schematically illustrated in FIG. 2 as including only the outer body 216, the mouthpiece 220, the atomizer 212, the reservoir 214, and the base 204, in light of the various alternate and additional components that may be included therein.

One or more components of the cartridge 200 may be configured to form an electrical connection with the connector 106. For example, referring to the cartridge implementation of FIG. 3, the first heating terminal 234*a* and the second heating terminal 234*b* (e.g., positive and negative terminals) at the opposing ends of the heating element 240 are configured to form an electrical connection with the connector. Further, the electronic control component 208 (see FIG. 3) may form an electrical connection with the connector through the control component terminal 206 (see FIG. 3). Components within the control body 102 (e.g., the control component 108) may thus employ the electronic control component to determine whether the cartridge is genuine and/or perform other functions. However, in other implementations the connection between the connector and the cartridge may not be electrical. In other words, the connection between the connector and the cartridge may be purely mechanical. In these implementations, atomization may occur outside of the cartridge or atomization may occur via other methods not requiring electrical connections between the cartridge and the control body such as via piezoelectric or radio frequency atomization. Alternatively, the power source may be positioned in the cartridge such that electrical connection with connector is not required.

In use, when a user draws on the aerosol delivery device 100, the heating element 240 of the atomizer 212 is activated to vaporize components of the aerosol precursor composition. Drawing upon the mouthpiece 220 of the aerosol delivery device causes ambient air to enter and pass through an opening in the connector 106 or in the cartridge 200. In the cartridge, the drawn air combines with the formed vapor to form an aerosol. The aerosol is whisked, aspirated or otherwise drawn away from the heating element and out the opening in the mouthpiece of the aerosol delivery device. However, the flow of air may be received through other parts of the aerosol delivery device in other implementations. As noted above, in some implementations the cartridge may include the flow tube 210. The flow tube may be configured to direct the flow of air to the heating element.

In particular, a sensor in the aerosol delivery device 100 may detect the flow of air throughout the aerosol delivery device. When a flow of air is detected, the control component 108 may direct current to the heating element 240 through a circuit including the first heating terminal 234*a* and the second heating terminal 234*b*. Accordingly, the heating element may vaporize the aerosol precursor composition directed to an aerosolization zone from the reservoir 214 by the liquid transport element 238. Thus, the mouthpiece 220 may allow passage of aerosol (i.e., the components of the aerosol precursor composition in an inhalable form) therethrough to a consumer drawing thereon.

Figure 4:
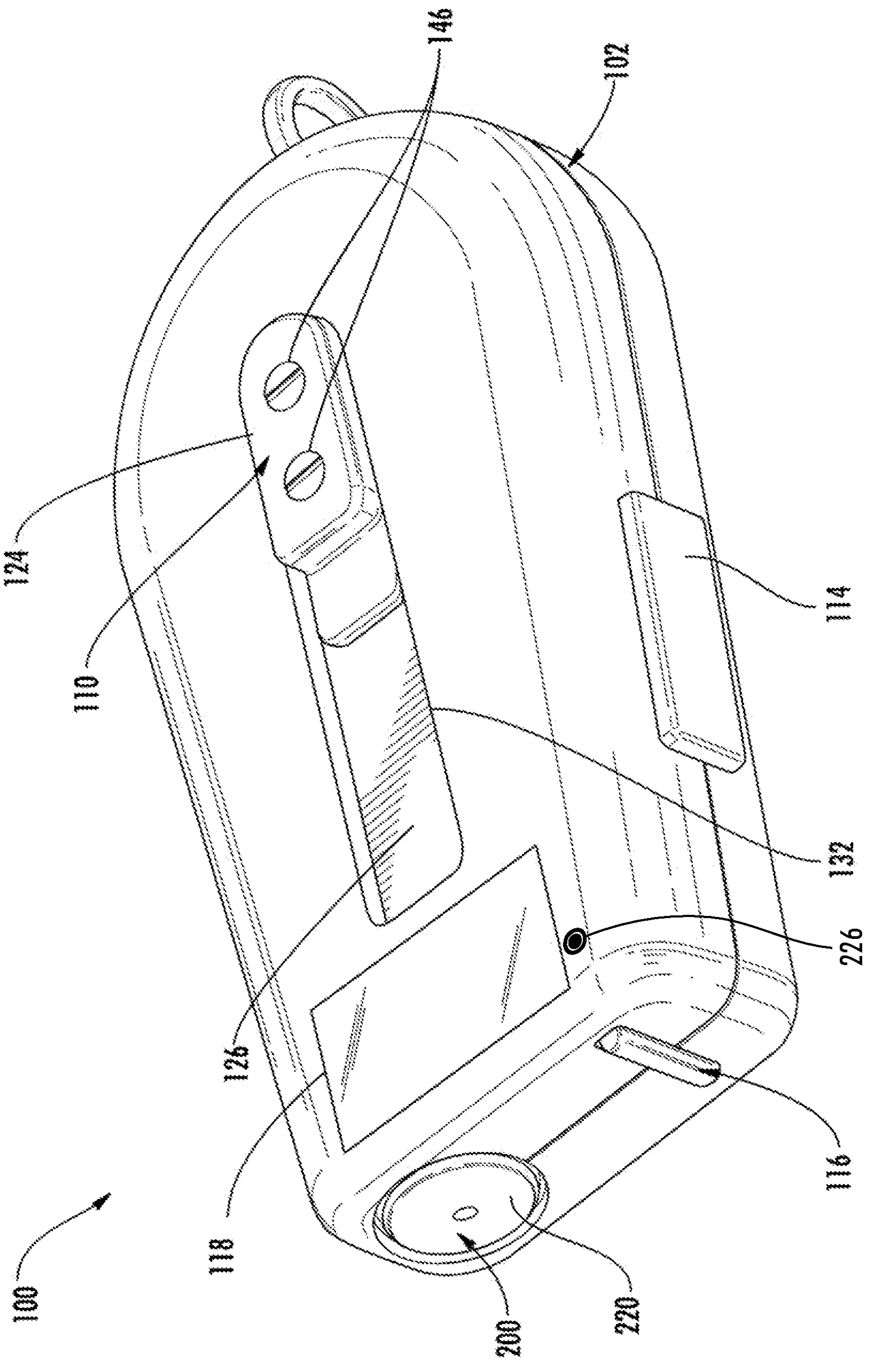
FIG. 4 illustrates a perspective view of the aerosol delivery device, according to an example implementation.
Figure 5:
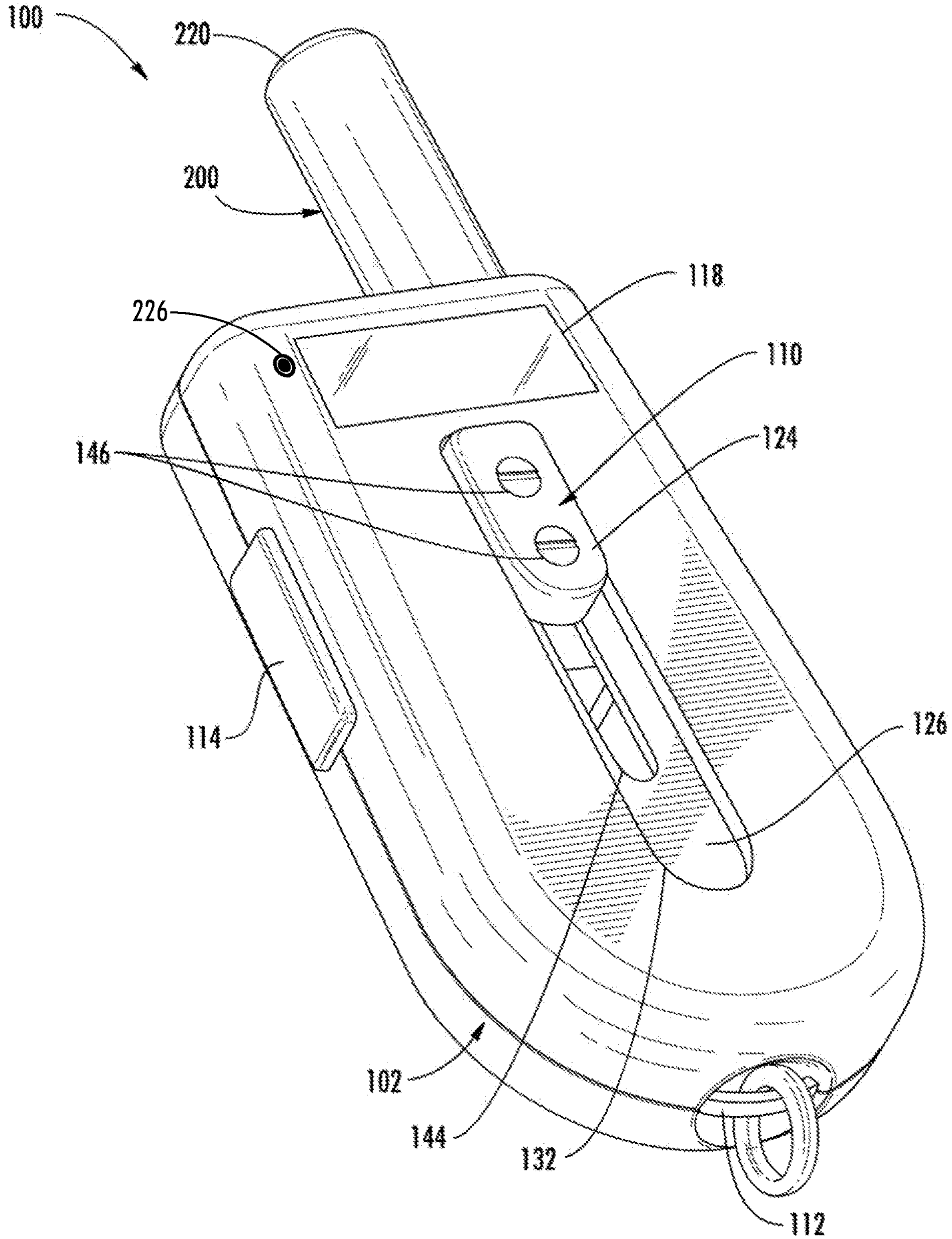
FIG. 5 illustrates an opposing perspective view of the aerosol delivery device, according to an example implementation.

FIG. 4 illustrates a perspective view of the aerosol delivery device 100 in the closed configuration, and FIG. 5 illustrates a perspective view of the aerosol delivery device in the extended configuration, having a particular form factor according to some example implementations. As illustrated, the control body 102 may define an ergonomic shape configured to comfortably fit within a user's hand. The shape of the control body, however, is not limited and may be any shape that accommodates the various elements as described herein. In some implementations, the control body may be expressly non-cylindrical.

As further illustrated in FIG. 5, the aerosol delivery device 100 may additionally include an attachment mechanism 112. The attachment mechanism 112 may comprise a loop, a clip, a ring, or other mechanism configured to attach to another device such as a keychain, a carabineer, or a lanyard. Accordingly, the aerosol delivery device may be retained in a desired position. Thus, for example, a user may be able to more easily secure the aerosol delivery device in a desired position at which the aerosol delivery device may be less prone to damage or misplacement.

The aerosol delivery device 100 may additionally include an input mechanism 114. The input mechanism may comprise a pushbutton or other switch configured to receive an input from a user. When the input mechanism is actuated, the aerosol delivery device may produce an output corresponding to a status of the aerosol delivery device. For example, the aerosol delivery device may output sound, vibration, or light. As illustrated in FIG. 4, the aerosol delivery device may further comprise an indicator 116. The indicator may comprise a light transmitter (e.g., plastic or glass, which may be tinted a desired color). Further, the indicator may include a light emitter, which may comprise an incandescent bulb or light emitting diode (LED). Thereby, the light emitter may illuminate the light transmitter, which may direct the light outwardly therethrough to output a status of the aerosol delivery device.

The indicator 116 may flash or otherwise illuminate to indicate a remaining or used portion of the capacity of the power source 104 or the reservoir 214. For example, a relatively large number of flashes of the indicator upon actuation of the input mechanism 114 may correspond to a relatively large remaining capacity of the power source or the reservoir. Conversely, a relatively small number of flashes of the indicator upon actuation of the input mechanism may correspond to a relatively small remaining capacity of the power source or the reservoir. However, the indicator and/or other output mechanisms may be employed to output various other information and/or output information in various other manners. Examples of other information that may be outputted include error messages, operational modes, historical usage information, etc.

In some implementations, the aerosol delivery device 100 may include a display 118, as illustrated in FIGS. 4 and 5. The display may be provided in addition to, or as an alternate for, the indicator 116. The display may be configured to output various information including information regarding a status of the aerosol delivery device, information unrelated to the status of the aerosol delivery device (e.g., the present time), and/or non-informative graphics (e.g., graphics provided for user entertainment purposes). Thereby, the display may be configured to output any or all of the information described above (e.g., a remaining or used portion of the capacity of the power source 104 or the reservoir 214) in any form such as graphical form and/or a numerical form. Further, in some implementations operation or the display may be controlled by the input mechanism 114 or a separate input mechanism. The display, for example, may be a touchscreen such as a capacitive touchscreen and thus may be configured for user input. In some implementations, the display may provide icons, menus, or the like configured to allow a user to make control selections related to the functioning of the aerosol delivery device, check a specific status of the device, or the like. Although the display is illustrated as encompassing only a relatively small portion of the aerosol delivery device, it is understood that the display may cover a significantly greater portion of the aerosol delivery device.

The aerosol delivery device 100 is also shown in FIGS. 4 and 5 as including the digital camera 226 on the control body 102. The digital camera is shown as being placed next to the display 118. It should be understood, however, that the digital camera may be placed at any of a number of other locations on the control body, on the same side as the display or on the opposing side. In some examples, the camera system 224 may include multiple cameras one of which may be placed on each side of the control body.

The various components of an aerosol delivery device 100 according to the present disclosure can be chosen from components described in the art and commercially available. Examples of batteries that can be used according to the disclosure are described in U.S. Pat. No. 9,484,155 to Peckerar et al., which is incorporated herein by reference.

The aerosol delivery device 100 can incorporate the flow sensor or another sensor or detector for control of supply of electric power to the heating element 240 when aerosol generation is desired (e.g., upon draw during use). As such, for example, there is provided a manner or method of turning off the power supply to the heating element when the aerosol delivery device is not be drawn upon during use, and for turning on the power supply to actuate or trigger the generation of heat by the heating element during draw. Additional representative types of sensing or detection mechanisms, structure and configuration thereof, components thereof, and general methods of operation thereof, are described in U.S. Pat. No. 5,261,424 to Sprinkel, Jr., U.S. Pat. No. 5,372,148 to McCafferty et al., and PCT Pat. App. Pub. No. WO 2010/003480 to Flick, all of which are incorporated herein by reference.

The aerosol delivery device 100 most preferably incorporates the control component 108 or another control mechanism for controlling the amount of electric power to the heating element 240 during draw. Representative types of electronic components, structure and configuration thereof, features thereof, and general methods of operation thereof, are described in U.S. Pat. No. 4,735,217 to Gerth et al., U.S. Pat. No. 4,947,874 to Brooks et al., U.S. Pat. No. 5,372,148 to McCafferty et al., U.S. Pat. No. 6,040,560 to Fleischhauer et al., U.S. Pat. No. 7,040,314 to Nguyen et al., U.S. Pat. No. 8,205,622 to Pan, U.S. Pat. No. 8,881,737 to Collet et al., U.S. Pat. No. 9,423,152 to Ampolini et al., U.S. Pat. No. 9,439,454 to Fernando et al., and U.S. Pat. App. Pub. No. 2015/0257445 to Henry et al., all of which are incorporated herein by reference. Representative types of substrates, reservoirs or other components for supporting the aerosol precursor are described in U.S. Pat. No. 8,528,569 to Newton, U.S. Pat. App. Pub. No. 2014/0261487 to Chapman et al., U.S. Pat. App. Pub. No. 2015/0059780 to Davis et al., and U.S. Pat. App. Pub. No. 2015/0216232 to Bless et al., all of which are incorporated herein by reference. Additionally, various wicking materials, and the configuration and operation of those wicking materials within certain types of electronic cigarettes, are set forth in U.S. Pat. No. 8,910,640 to Sears et al., which is incorporated herein by reference.

The aerosol precursor composition, also referred to as a vapor precursor composition, may comprise a variety of components including, by way of example, a polyhydric alcohol (e.g., glycerin, propylene glycol or a mixture thereof), nicotine, tobacco, tobacco extract and/or flavorants. Representative types of aerosol precursor components and formulations also are set forth and characterized in U.S. Pat. No. 7,217,320 to Robinson et al., U.S. Pat. No. 9,254,002 to Chong et al., U.S. Pat. No. 8,881,737 to Collett et al., U.S. Pat. Pub. No. 2013/0008457 to Zheng et al., U.S. Pat. Pub. No. 2015/0020823 to Lipowicz et al., and U.S. Pat. Pub. No. 2015/0020830 to Koller, as well as PCT Pat. App. Pub. No. WO 2014/182736 to Bowen et al., and U.S. patent application Ser. No. 15/222,615 to Watson et al., filed Jul. 28, 2016, the disclosures of which are incorporated herein by reference. Other aerosol precursors that may be employed include the aerosol precursors that have been incorporated in the VUSE® product by R. J. Reynolds Vapor Company, the BLU™ product by Imperial Tobacco Group PLC, the MISTIC MENTHOL product by Mistic Ecigs, and the VYPE product by CN Creative Ltd. Also desirable are the so-called "smoke juices" for electronic cigarettes that have been available from Johnson Creek Enterprises LLC.

Implementations of effervescent materials can be used with the aerosol precursor, and are described, by way of example, in U.S. Pat. App. Pub. No. 2012/0055494 to Hunt et al., which is incorporated herein by reference. Further, the use of effervescent materials is described, for example, in U.S. Pat. No. 4,639,368 to Niazi et al., U.S. Pat. No. 5,178,878 to Wehling et al., U.S. Pat. No. 5,223,264 to Wehling et al., U.S. Pat. No. 6,974,590 to Pather et al., U.S. Pat. No. 7,381,667 to Bergquist et al., U.S. Pat. No. 8,424,541 to Crawford et al., and U.S. Pat. No. 8,627,828 to Strickland et al., as well as U.S. Pat. No. 9,307,787 to Sun et al., U.S. Pat. App. Pub. No. 2010/0018539 to Brinkley et al., and PCT Pat. App. Pub. No. WO 97/06786 to Johnson et al., all of which are incorporated by reference herein. Additional description with respect to implementations of aerosol precursor compositions, including description of tobacco or components derived from tobacco included therein, is provided in U.S. patent application Ser. Nos. 15/216,582 and 15/216,590, each filed Jul. 21, 2016 and each to Davis et al., which are incorporated herein by reference.

Additional representative types of components that yield visual cues or indicators may be employed in the aerosol delivery device 100, such as LEDs and related components, auditory elements (e.g., speakers), vibratory elements (e.g., vibration motors) and the like. Examples of suitable LED components, and the configurations and uses thereof, are described in U.S. Pat. No. 5,154,192 to Sprinkel et al., U.S. Pat. No. 8,499,766 to Newton, U.S. Pat. No. 8,539,959 to Scatterday, and U.S. Pat. No. 9,451,791 to Sears et al., all of which are incorporated herein by reference.

Yet other features, controls or components that can be incorporated into aerosol delivery devices of the present disclosure are described in U.S. Pat. No. 5,967,148 to Harris et al., U.S. Pat. No. 5,934,289 to Watkins et al., U.S. Pat. No. 5,954,979 to Counts et al., U.S. Pat. No. 6,040,560 to Fleischhauer et al., U.S. Pat. No. 8,365,742 to Hon, U.S. Pat. No. 8,402,976 to Fernando et al., U.S. Pat. App. Pub. No. 2005/0016550 to Katase, U.S. Pat. No. 8,689,804 to Fernando et al., U.S. Pat. App. Pub. No. 2013/0192623 to Tucker et al., U.S. Pat. No. 9,427,022 to Leven et al., U.S. Pat. App. Pub. No. 2013/0180553 to Kim et al., U.S. Pat. App. Pub. No. 2014/0000638 to Sebastian et al., U.S. Pat. App. Pub. No. 2014/0261495 to Novak et al., and U.S. Pat. No. 9,220,302 to DePiano et al., all of which are incorporated herein by reference.

Figure 6:
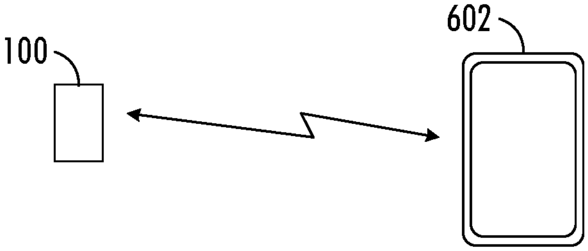
FIG. 6 illustrates the aerosol delivery device configured to wirelessly communicate with a computing device, according to some example implementations of the present disclosure.

FIG. 6 illustrates the aerosol delivery device 100 configured to wirelessly communicate with a computing device 602, indirectly via one or more networks, according to some example implementations of the present disclosure. Examples of suitable computing devices include any of a number of different mobile computers. More particular examples of suitable mobile computers include portable computers (e.g., laptops, notebooks, tablet computers), mobile phones (e.g., cell phones, smartphones), wearable computers (e.g., smartwatches) and the like. In other examples, the computing device may be embodied as other than a mobile computer, such as in the manner of a desktop computer, server computer or the like. And in yet other examples, the computing device may be embodied as an Internet of Things (IoT) device such as a network-connected thermostat, electric light, light switch or the like. Examples of suitable manners according to which the aerosol delivery device may be configured to wirelessly communicate with the computing device are disclosed in U.S. Pat. App. Pub. No. 2016/0007651 to Ampolini et al., and U.S. Pat. App. Pub. No. 2016/0219933 to Henry, Jr. et al., each of which is incorporated herein by reference.

As introduced above, in some examples, the aerosol delivery device 100 additionally includes a camera system 224 with a digital camera 226 configured to capture video imagery of a scene in its field of view. The camera system or the control component 108 of the aerosol delivery device is configured to perform video content analytics on the video imagery to detect a temporal or spatial event in the scene. The camera system or the control component is configured to transfer the video imagery and/or information indicative of the temporal or spatial event to the computing device 602 configured to store or display the video imagery or information, or perform at least one control operation based on the information.

In some examples, the temporal or spatial event is a number of people in a room climate controlled by a heating or cooling system, and the computing device 602 is a network-connected thermostat of or coupled to the heating or cooling system. In these examples, the camera system 224 or the control component 108 is configured to transfer information indicative of the number of people in the room to the network-connected thermostat configured to perform at least one control operation including control of the heating or cooling system based thereon.

In some examples, the temporal or spatial event is a person in an environment with an electric light. This environment may an indoor space such as a room, or an outdoor space such as an outdoor light, streetlight or the like. In these examples, the camera system 224 or the control component 108 is configured to transfer information indicative of the person in the environment to the computing device 602 configured to perform at least one control operation including control of the at least one electric light based thereon.

In some more particular examples, the electric light is a network-connected electric light with the computing device 602 embedded therein, and the camera system 224 or control component 108 is configured to transfer the information to the network-connected electric light. In other more particular examples, the computing device is a network-connected light switch coupled to the electric light, and the camera system or control component is configured to transfer the information to the network-connected light switch.

In some examples, the temporal or spatial event is a person or number of people in an environment. In these examples, the camera system 224 or the control component 108 is configured to transfer information indicative of the person or number of people in the environment to the computing device 602 configured to perform at least one control operation including output of a notification of the person or number of people in the environment. In some more particular examples, the camera system or the control component is configured to transfer the video imagery and information indicative of the person or number of people in the environment to the computing device. In these examples, the computing device is configured to perform at least one control operation including output of the notification that includes display of the video imagery with a visual indicator of the person or number of people thereon.

In some examples, the temporal or spatial event is a person or number of people in an environment. In some of these examples, the camera system 224 or the control component 108 is configured to transfer at least one of the video imagery or information in response to a second temporal or spatial event in the environment, the camera system or the control component is configured to transfer an indication of the second temporal or spatial event with the video imagery or information. One example of a suitable second temporal or spatial event is a hazardous condition in the environment, and examples of suitable hazardous events include fire, flood, carbon monoxide and the like.

In some examples, the temporal or spatial event is a person in an environment, and the camera system 224 or the control component 108 being configured to perform video content analytics includes being configured to detect a facial expression of the person, such as using contour analysis. In some of these examples, the camera system or the control component is configured to transfer at least one of the video imagery or information in response to a second temporal or spatial event. The camera system or the control component is configured to transfer an indication of the second temporal or spatial event with the video imagery or information, and the second temporal or spatial event including distress detected based on the facial expression of the person. Examples of distress in these examples include the person exhibiting sleepiness while operating a motor vehicle, exhibiting anxiousness, or exhibiting medical distress such as heart distress. Other second temporal or spatial events may be based on other facial expressions such as in the case of a person exhibiting happiness or increased concentration.

In some examples, the scene in the video imagery is a parking lot including a layout of parking spaces, and the temporal or spatial event in the scene is an open one of the parking spaces. In these examples, the camera system 224 or the control component 108 is configured to transfer the video imagery and information indicative of the open one of the parking spaces to the computing device 602. And the computing device is configured to perform at least one control operation including display of the video imagery with a visual indicator of the open one of the parking spaces thereon.

The foregoing description of use of the article(s) can be applied to the various example implementations described herein through minor modifications, which can be apparent to the person of skill in the art in light of the further disclosure provided herein. The above description of use, however, is not intended to limit the use of the article but is provided to comply with all necessary requirements of disclosure of the present disclosure. Any of the elements shown in the article(s) illustrated in FIGS. 1-6 or as otherwise described above may be included in an aerosol delivery device according to the present disclosure.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed, and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An aerosol delivery device comprising:

a cartridge containing an aerosol precursor composition;

a control body coupled to the cartridge, the control body comprising a control component configured to control delivery of the aerosol precursor composition in response to detection of airflow through at least a portion of the cartridge or control body;

a camera system comprising a digital camera configured to capture video imagery of a scene; and a processor configured to perform video content analytics on the video imagery and output a control signal to a network device to cause the network device to perform at least one operation based on the control signal.

2. The aerosol delivery device of claim 1, wherein the control component comprises the processor.

3. The aerosol delivery device of claim 1, wherein the camera system comprises the processor.

4. The aerosol delivery device of claim 1, wherein the aerosol delivery device communicates wirelessly with the network device.

5. The aerosol delivery device of claim 1, wherein the network device comprises an Internet of Things (IoT) device.

6. The aerosol delivery device of claim 5, wherein the IoT device comprises one or more of a thermostat, an electric light, a light switch, a display, or a computing device.

7. The aerosol delivery device of claim 1 further comprising an atomizer configured to vaporize components of the aerosol precursor composition.

8. The aerosol delivery device of claim 1, wherein a housing is coupled to the cartridge, the housing including a reservoir configured to hold the aerosol precursor composition.

9. The aerosol delivery device of claim 8, wherein the aerosol precursor composition comprises glycerin and nicotine.

10. The aerosol delivery device of claim 1, wherein the camera system comprises a second digital camera configured to capture video imagery of the scene or another scene.

11. The aerosol delivery device of claim 1, wherein the processor comprises a memory configured to store the video imagery, the video content analytics on the video imagery, or both.

12. The aerosol delivery device of claim 1 further comprising a display configured to display the video imagery, the video content analytics on the video imagery, or both.

13. The aerosol delivery device of claim 1, wherein the camera system is configured to detect a temporal or spatial event that is a number of people in a room climate controlled by a heating or cooling system, the network device is a network-connected thermostat coupled to the heating or cooling system, and the control signal output by the processor is sent to the thermostat to control the heating or cooling system based on the temporal or spatial event.

14. The aerosol delivery device of claim 1, wherein the camera system is configured to detect a temporal or spatial event that is a person in an environment with an electric light, the network device is a network-connected light switch coupled to the electric light, and the control signal output by the processor is sent to the light switch to control the electric light based on the temporal or spatial event.

15. The aerosol delivery device of claim 1, wherein the camera system is configured to detect a first temporal or spatial event that is a person in an environment and a second temporal or spatial event that is a facial expression of the person and the processor is configured to detect distress based on the facial expression of the person.

16. The aerosol delivery device of claim 15, wherein the control signal output by the processor is sent to a computing device to provide an indication of the person in distress or a hazardous condition.

17. The aerosol delivery device of claim 1, wherein the camera system is configured to detect a temporal or spatial event that is a parking lot including a layout of parking spaces, and the control signal output by the processor indicates an open one of the parking spaces in the scene.

18. A control body of an aerosol delivery device, the control body comprising:

a housing to which a cartridge of aerosol precursor composition is coupleable to form the aerosol delivery device;

a control component contained within the housing and configured to control delivery of the aerosol precursor composition in response to detection of airflow through at least a portion of the housing or cartridge; and a camera system comprising a digital camera configured to capture video imagery of a scene; and a processor configured to perform video content analytics on the video imagery and output a control signal to a network device to cause the network device to perform at least one operation based on the control signal.

19. The aerosol delivery device of claim 18, wherein the control component communicates wirelessly with the network device.

20. The aerosol delivery device of claim 18, wherein the network device comprises an Internet of Things (IoT) device.

21. The aerosol delivery device of claim 20, wherein the IoT device comprises one or more of a thermostat, an electric light, a light switch, a display, or a computing device.

* * * * *